United States Patent [19]
Weerackody et al.

[11] Patent Number: 5,689,439
[45] Date of Patent: Nov. 18, 1997

[54] SWITCHED ANTENNA DIVERSITY TRANSMISSION METHOD AND SYSTEM

[75] Inventors: Vijitha Weerackody, Watchung, N.J.; William Glenn Zeng, Germantown, Md.

[73] Assignee: Lucent Technologies, Inc., Murray Hill, N.J.

[21] Appl. No.: 414,987

[22] Filed: Mar. 31, 1995

[51] Int. Cl.[6] .......................... G06K 15/00; H04L 1/00; H04B 7/02; H04B 7/06
[52] U.S. Cl. ...................... 364/514 R; 371/30; 371/35; 455/91; 455/101; 375/295
[58] Field of Search ............................... 371/43, 30, 37.1, 371/37.4, 35, 40.3; 375/267, 347, 224; 455/135, 101, 277.1, 277.2, 121, 52.3, 56.1; 364/514 R, 400; 348/264, 393, 394, 395, 396, 398, 409; 358/432, 433, 426

[56] References Cited

U.S. PATENT DOCUMENTS

| | | | |
|---|---|---|---|
| 3,693,088 | 9/1972 | Rustako, Jr. et al. | 455/52.3 |
| 5,305,353 | 4/1994 | Weerackody | 375/347 |
| 5,430,769 | 7/1995 | Patsiokas et al. | 375/347 |
| 5,491,723 | 2/1996 | Diepstraten | 375/267 |
| 5,548,598 | 8/1996 | Dupont | 371/35 |

OTHER PUBLICATIONS

S. Wicker, "Adaptive Rate Error Control Trhough the Use of Diversity Combining and Majority–Logic Decoding in a Hybrid–ARQ Protocol", IEEE Transactions on Communications, vol. 39, No. 3, pp. 380–385, Mar. 1991.

P. Monsen, "Adaptive Equalization of the Slow Fading of the Slow Fading Channel", IEEE Transactions on Communications, vol. com–22, No. 8, Aug. 1974.

*Primary Examiner*—Wellington Chin
*Assistant Examiner*—Melissa Kay Carman

[57] ABSTRACT

The present invention is an improved switched antenna diversity transmission system for use with an ARQ error protection protocol. The transmitter of the present invention includes an error detection encoder for encoding information packets with an error detection code, a modulator for modulating the encoded information packets, and a first antenna for transmitting the modulated information packets over a first forward channel of a wireless communication medium to the receiver. The transmitter further includes a switch for switching from the first antenna to a second antenna for transmitting the information packets over a second forward channel of a wireless communication medium in response to a negative acknowledgment from the receiver transmitted over a feedback channel of the wireless communication medium.

23 Claims, 14 Drawing Sheets

Nondifferential Huffman Coded Frames

| CODE   | LENGTH | DESCRIPTION            |
|--------|--------|------------------------|
| 0xffc0 | V      | Baseline DCT           |
| 0xffc1 | V      | Extended sequential DCT |
| 0xffc2 | V      | Progressive DCT        |
| 0xffc3 | V      | Lossless (sequential)  |

Differential Huffman Coded Frames

| CODE   | LENGTH | DESCRIPTION               |
|--------|--------|---------------------------|
| 0xffc5 | V      | Differential sequential DCT |
| 0xffc6 | V      | Differential progressive DCT |
| 0xffc7 | V      | Differential lossless     |

Nondifferential Arithmetic Coded Frames

| CODE   | LENGTH | DESCRIPTION            |
|--------|--------|------------------------|
| 0xffc9 | V      | Extended sequential DCT |
| 0xffca | V      | Progressive DCT        |
| 0xffcb | V      | Lossless (sequential)  |

Differential Arithmetic Coded Frames

| CODE   | LENGTH | DESCRIPTION               |
|--------|--------|---------------------------|
| 0xffcd | V      | Differential sequential DCT |
| 0xffce | V      | Differential progressive DCT |
| 0xffcf | V      | Differential lossless     |

FIG. 3A

PRIOR ART

| CODE | LENGTH | DESCRIPTION |
| --- | --- | --- |
| 0xff01 | N | For temporary use in arithmetic coding |
| 0xff02-0xffbf | U | Reserved |
| 0xffc4 | V | Define Huffman table(s) |
| 0xffc8 | U | Reserved for JPEG extensions |
| 0xffcc | V | Define arithmetic conditioning table(s) |
| 0xffd0-0xffd7 | N | Restart with modulo 8 counter |
| 0xffd8 | N | Start of image |
| 0xffd9 | N | End of image |
| 0xffda | V | Start of scan |
| 0xffdb | V | Define quantization table(s) |
| 0xffdc | 4 | Define number of lines |
| 0xffdd | 4 | Define restart interval |
| 0xffde | V | Define hierarchical progression |
| 0xffdf | 3 | Expand reference image |
| 0xffe0-0xffef | V | Reserved for application use |
| 0xfff0-0xfffd | U | Reserved for JPEG extensions |
| 0xfffe | V | Comment |

FIG. 3B

PRIOR ART

SWITCHED ANTENNA DIVERSITY TRANSMISSION METHOD AND SYSTEM

FIELD OF THE INVENTION

The present invention relates generally to the field of communications, and particularly to the field of wireless communication over slow fading channels.

BACKGROUND OF THE INVENTION

Transmission errors are abundant on many wireless communication channels. One cause is multipath fading, wherein multiple copies of an information packet reach the receiver over multiple paths with different time delays, amplitudes, and phases due to scattering and reflection. As the multiple copies of the information packet destructively interfere with each other the level of the received signal falls.

If the level of the received signal falls below a usable threshold level, (characterized by a very small signal-to-noise ratio (SNR)) the channel is said to be in a deep fade. For channels with slow fading characteristics, namely channels whose characteristics vary slowly relative to the data transmission rate, a deep fade can result in long bursts of bit errors.

Antenna diversity is used to reduce the effects of multipath fading on channels with slow fading characteristics. One form of antenna diversity is switched antenna diversity.

In traditional switched antenna diversity transmission systems, multiple antennas provide multiple channels, having independent multipath fading characteristics, to be used one at a time as existing channel conditions change. Specifically, the receiver constantly compares the received signal strength to a predetermined threshold which detects when the channel is in a deep fade. If the received signal falls below the threshold, an explicit message is sent over a feedback channel to inform the transmitter of the bad channel condition and to request that the transmitter switch to a different antenna, i.e., another channel.

Because traditional switched antenna diversity systems use dynamic thresholding, additional processing circuitry is required at the receiver for threshold detection and adjustment. Moreover, a feedback channel that could otherwise be used for an ARQ error protection protocol is allocated instead just for explicit control messages from the receiver.

There is a need for a cost effective switched antenna diversity transmission method and system for transmitting information over slow fading channels which more efficiently uses a feedback communication channel.

SUMMARY OF THE INVENTION

The present invention provides a cost effective switched antenna diversity transmission method and system for transmitting information over slow fading channels which more efficiently uses a feedback communication channel. The present invention does not require dynamic thresholding to determine the condition of the channel, and thus the receiver can be built without the expense of additional thresholding circuitry. In addition, the present invention does not use a feedback channel just for transmitting explicit channel condition messages or explicit requests for the transmitter to change antennas when a given channel is bad. Rather, the present invention uses the feedback channel with an ARQ error protection protocol to request retransmission of erroneous packets, to implicitly indicate the existing channel condition, and when the channel is bad, to switch antennas.

In more detail, following the transmission of each information packet over a forward communication channel, the transmitter waits for a positive or negative acknowledgement from the receiver. If no error is detected in the received packet, a positive acknowledgement (ACK) is sent over the feedback channel to the transmitter. If, on the other hand, an error is detected, a negative acknowledgement (NAK) is sent by the receiver over the feedback channel to request retransmission of the erroneous information packet, in response to which, the transmitter switches antennas and re-transmits the erroneous packet.

One illustrative embodiment of the present invention comprises a transmitter. The transmitter includes an error detection encoder for encoding the information packets to be transmitted with an error detection code. The transmitter further includes a modulator for modulating each of the encoded information packets. A first antenna transmits the modulated, encoded information packets to a receiver over a first forward channel of a communication medium. A switch in the transmitter causes the information packets to be re-transmitted from a second antenna over a second forward channel of the communication medium in response to a negative acknowledgement (NAK) from the receiver transmitted over a feedback channel of the communication medium.

Further illustrative embodiments of the present invention provide a transmitter according to the present invention for transmitting JPEG images with unequal error protection.

BRIEF DESCRIPTION OF THE DRAWINGS

FIGS. 3A and 3B are tables listing the start of frame and non-start of frame markers of a JPEG image, respectively.

DETAILED DESCRIPTION OF THE INVENTION

The present invention uses an ARQ protocol for error protection. Other protocols, including hybrid ARQ protocols, may be used.

ARQ protocols use a feedback channel over which the receiver can request retransmission of erroneous information packets, and in doing so, provide relatively error-free wireless communication channels.

The transmitter in an ARQ-based transmission system encodes the information packets to be transmitted with an error detection code to enable the receiver to detect whether there are any erroneous information packets to re-transmit.

Following the transmission of a each encoded data packet over a forward communication channel, the transmitter waits for an acknowledgement from the receiver. If no errors are detected in a received information packet, the information packet is delivered to the data sink and a positive acknowledgement is sent back to the transmitter, which, in response, sends the next information packet to the receiver. If, on the other hand, an error is detected in the received information packet, the receiver discards the information packet and a negative acknowledgement is sent to the transmitter which, in response, re-transmits the erroneous information packet.

Hybrid ARQ protocols use both an error detection code and an error correction code. In one hybrid ARQ protocol, an erroneous information packet is re-transmitted only if it cannot be corrected by the error correction code. In another hybrid ARQ protocol, the packets are encoded with an error correction code only when necessary, such as, for example, in response to a negative acknowledgement.

The present invention uses switched antenna diversity to reduce the effects of multi-path fading on slow fading channels and thus the number of ARQ re-transmissions that are needed. The switched antenna diversity of the present invention is responsive to the negative acknowledgement of the ARQ and hybrid ARQ protocols rather than the explicit channel condition messages and requests to switch antennas associated with dynamic thresholding.

For clarity of explanation, the illustrative embodiments of the present invention set forth below are presented as functional blocks. The functions these blocks represent may be implemented with shared or dedicated hardware, including, but not limited to, hardware capable of executing software. Illustrative embodiments may comprise digital signal processor hardware, such as the AT&T DSP16 or DSP32C, and software performing the operations discussed below. Very large scale integration (VLSI) hardware embodiments of the present invention, as well as hybrid DSP/VLSI embodiments, may also be provided.

The First Illustrative Embodiment

Figure 1A:
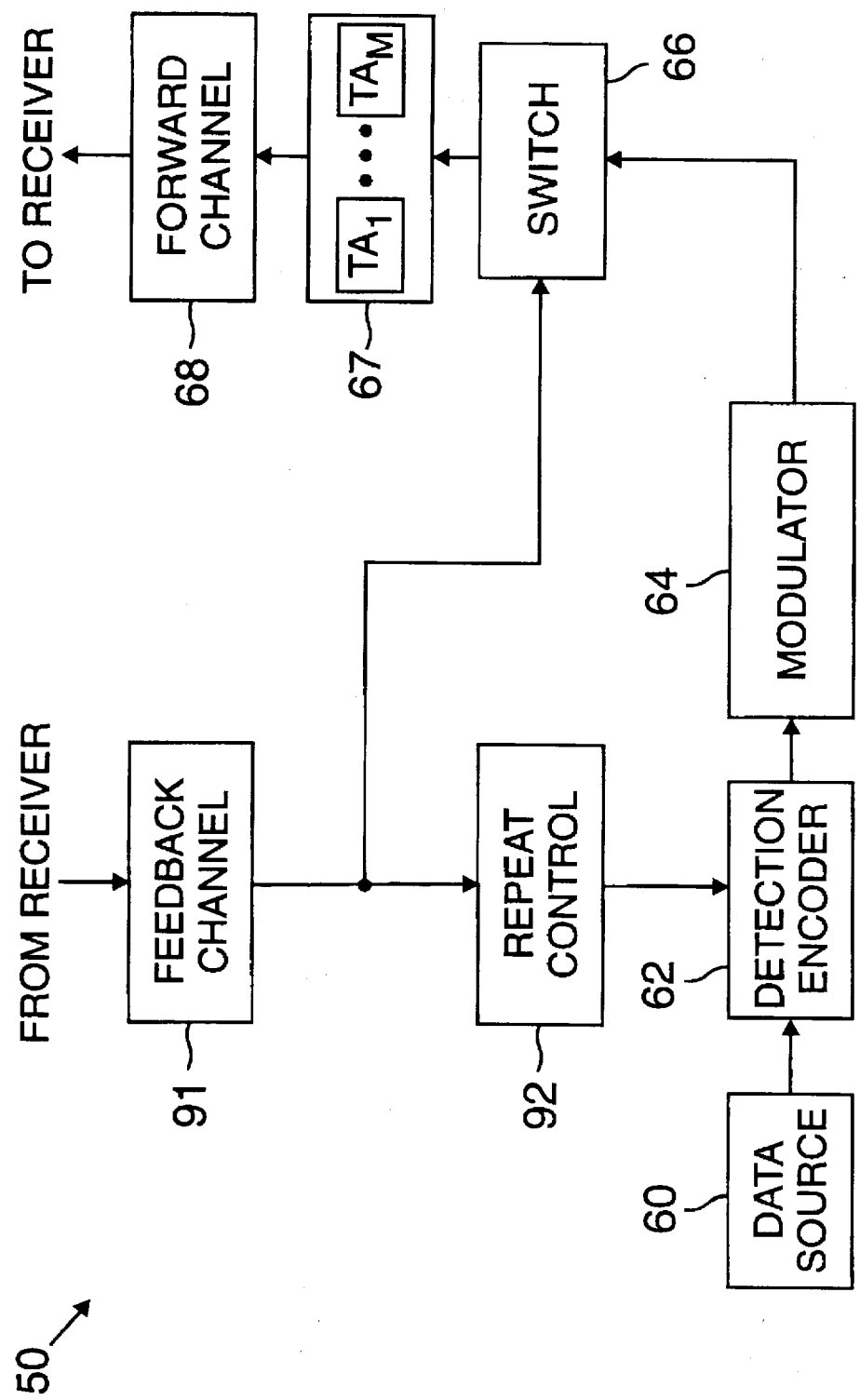
FIGS. 1A and 1B show a first illustrative embodiment of the present invention.
Figure 1B:
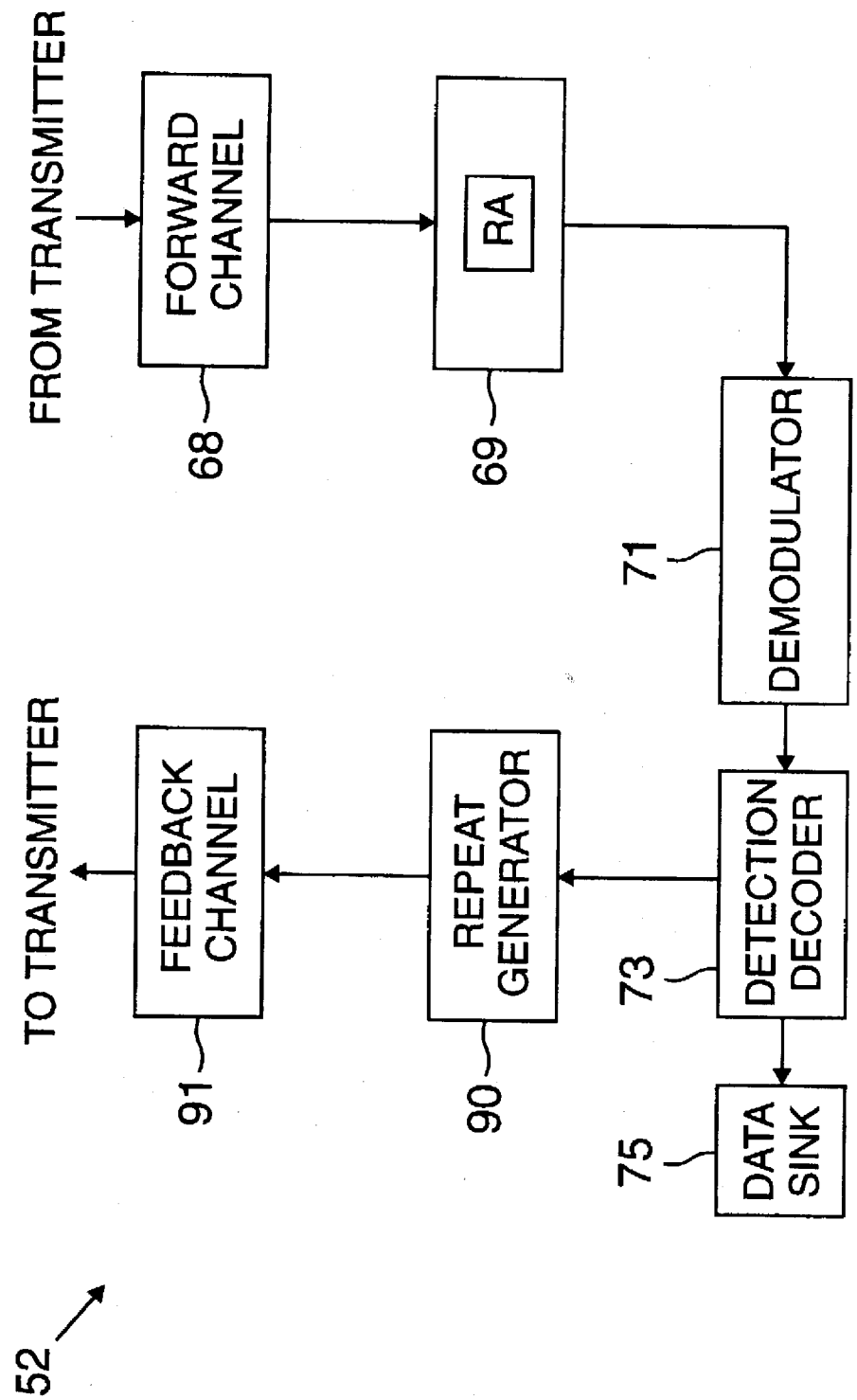

A first illustrative embodiment of the present invention is shown in FIGS. 1A and 1B. FIG. 1A shows a transmitter 50 and FIG. 1B shows a receiver 52.

The transmitter 50 in FIG. 1A includes an error detection encoder 62, a modulator 64, an antenna switch 66, and multiple transmission antennas ($TA_1$–$TA_M$) 67 which include associated transmission circuitry (comprising conventional carrier, pulse shaping, and power amplification circuits). Also included is a repeat controller 92.

The receiver 52 in FIG. 1B includes one or more reception antennas (RA) 69 which include associated reception circuitry (comprising, e.g., low noise amplifiers, RF/IF bandpass filters, and a match filter). The receiver 52 also includes a demodulator 71, an error detection decoder 73, and a repeat generator 90. The transmitter 50 receives information packets from a data source 60, as shown in FIG. 1A. The information packets are encoded by the error detection encoder 62 with a suitable error detection code known to those of ordinary skill in the art. The error detection code enables the receiver to detect transmission errors in the information packets. One suitable error detection encoder is a CRC-16 encoder which encodes the information packets with a 16-bit cyclic redundancy code.

Once the packets have been encoded with an error detection code, they are modulated by modulator 64 and transmitted by one of the antennas ($TA_1$–$TA_M$) 67 over a forward channel 68 of the communication medium to the receiver 52 in FIG. 1B. Any suitable modulator known to those of ordinary skill in the art may be used for modulator 64. One suitable modulator is a 4-DPSK modulator.

The reception antenna 69 of receiver 52 is used to receive the information packets that are transmitted. Once received, the packets are demodulated by a suitable, complementary demodulator 71. For a 4-DPSK modulator, a suitable demodulator is a 4-DPSK demodulator.

The error detection decoder 73 decodes the demodulated information packets to determine whether there are transmission errors in any of the packets. The decoder 73 normally regenerates the error detection code for each information packet and compares it against the error detection code transmitted with the information packet. If the two codes match, presumably there is no error in the transmitted packet. If the two codes do not match, there is one or more errors in the transmitted packet. The error detection encoder 73 may be any suitable, complementary error detection decoder. For example, for a CRC-16 encoder, a suitable decoder would be a CRC-16 decoder.

If no error is found in the information packet, the packet is forwarded to data sink 75 and a positive acknowledgement (ACK) is sent by repeat generator 90 over feedback channel 91 to transmitter 50. In response to the positive acknowledgement, the repeat controller 92 of transmitter 50 sends the next data packet.

If, on the other hand, an error is found in the information packet, the information packet is normally discarded, and a request to re-transmit the packet is transmitted over feedback channel 91 by repeat generator 90. The request to re-transmit is called a negative acknowledgement (NAK).

The repeat controller 92 of transmitter 50 responds to this request by re-transmitting the erroneous information packet. Each transmitted packet may be stored before transmission in a buffer or other suitable memory device so that it is readily available for retransmission.

The transmitter 50 also responds to the negative acknowledgement (NAK) by actuating switch 66 which, in turn, changes from the current transmit antenna to another one of the multiple transmit antennas 67 for transmitting information packets to the receiver. As mentioned above, the negative acknowledgement implicitly indicates that the current transmission channel is bad.

The switch 66 may be any suitable device known to those of ordinary skill in the art which functions to change antennas. For example, the switch 66 may be an electronic switch or a magnetic switch. Moreover, switch 66 may be a hardware switch or a programmable software switch.

Introduction To JPEG Illustrative Embodiments

The present invention is particularly suited for JPEG image transmission. The present invention therefore may be used with the unequal error protection ARQ embodiments of the concurrently filed Weerackody patent application entitled "TRANSMISSION METHOD AND SYSTEM FOR JPEG IMAGES," application Ser. No. 422,409, filed on Mar. 31, 1995, which is incorporated herein by reference.

JPEG is the international standard for still image compression. JPEG is named after the group that developed the international standard—the Joint Photographic Experts Group. A complete description of the JPEG standard is given in W. B. Pennebaker, J. L. Mitchell, *JPEG Still Image Data Compression Standard* (Van Norstrand Reinhold, New York 1993).

JPEG compressed image data contains two classes of segments: (i) entropy coded segments, representing 16×16 blocks of the image, and (ii) markers or marker segments, which contain header information, transformation and quantization tables, and other information required for the JPEG decoder to interpret and decode the entropy coded image data. Included among the markers are restart markers which separate the entropy coded segments.

Figure 2:
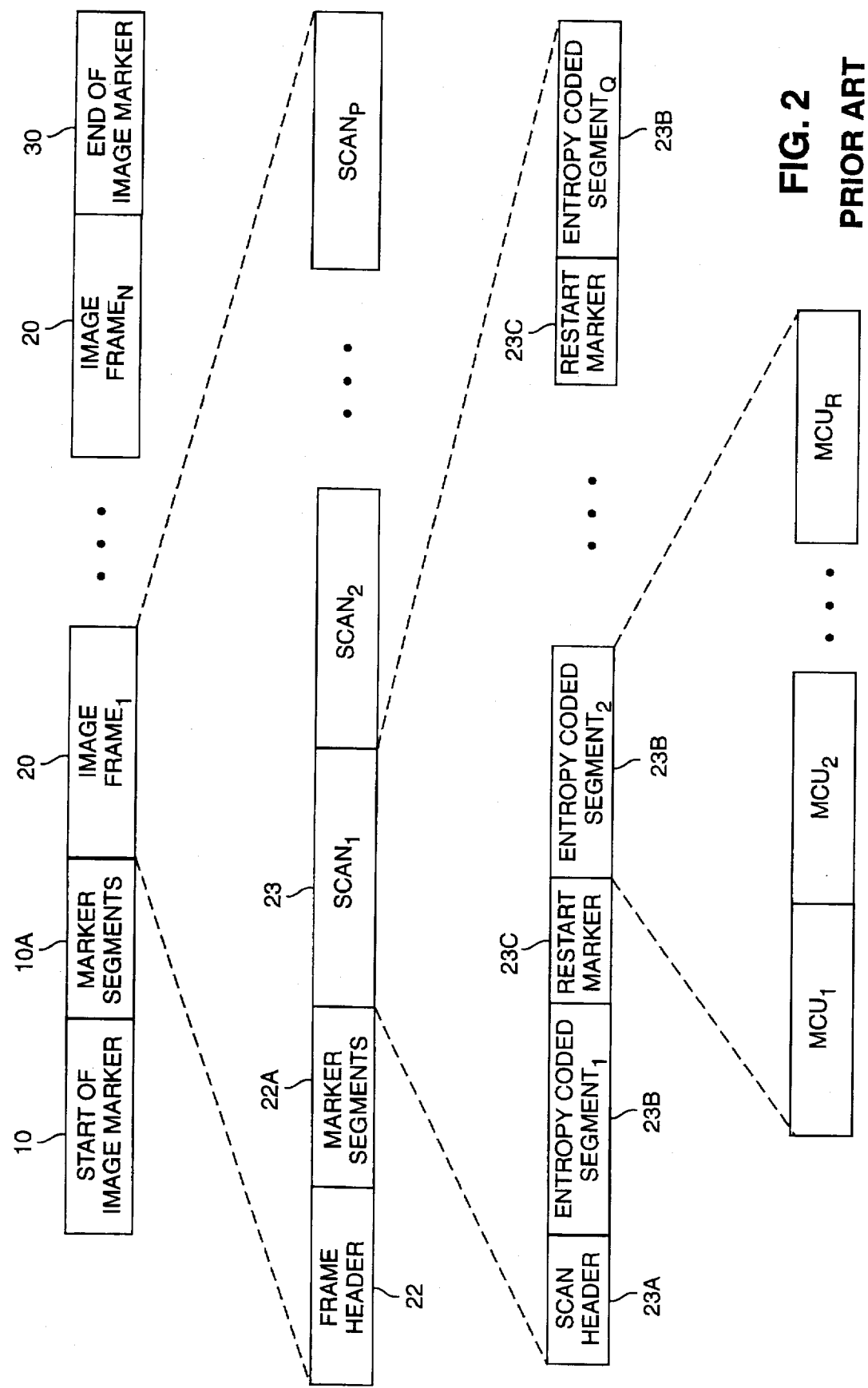
FIG. 2 shows the structure of a typical JPEG compressed image.

FIG. 2 shows the structure of a typical JPEG coded image 50. A start of image marker 10 and marker segments 10A begin one or more image frames 20 (i.e., the compressed image data stream), and an end of image marker 30 terminates the image frame or frames. The marker segments 10A define quantization tables, entropy-coding (transformation) tables, and other miscellaneous parameters.

A frame header 22 and marker segments 22A are generated at the beginning of each image frame 20. The frame header 22 begins with a start of frame marker followed by parameter values needed for decoding the frame. For example, the frame header defines the basic attributes of the image, including image size, number of image components, the mode of compression, and the entropy coder used within the frame. Like the marker segments preceding the image frame, marker segments 22A also define quantization tables, entropy coding (transformation) tables, and other miscellaneous parameters.

Each image frame 20 is composed of one or more scans 23 through the image data, where a scan is a single pass through the data for one or more components of the image. The components of each scan are grouped into one or more entropy coded segments 23B which are separated by restart markers 23C. The components in each entropy coded segment are further grouped into one or more minimum coded units ("MCUs") generally representing 16×16 blocks of the image.

Appended to the beginning of each scan in an image frame 20 is a scan header 23A. The scan header 23A begins with a start of scan marker followed by parameter values needed for decoding the scan, such as the number of components in the scan and the scan component specification.

Marker segments begin with a "marker" which is a two-byte hexadecimal code or word. The first byte is always a byte-aligned Oxff (Ox representing that the bytes in the image data stream are in hexadecimal form and the hexadecimal byte ff signifying a marker). The second byte is a "marker code" which identifies the function of the marker segment. The second byte is always a non-zero byte.

For example, the start of image marker is Oxffd8 and the end of image marker is Oxffd9. In both cases, the byte ff denotes a marker, and the marker codes d8 and d9 identify the markers as the start of image and end of image markers, respectively.

The tables in FIGS. 3A and 3B list the markers in a JPEG image: the table in FIG. 3A includes the start of frame markers (defining the entropy encoding procedure used), and the table in FIG. 3B includes all of the other, non-start of frame markers.

These markers fall into two categories: those without parameters, and those followed by a fixed, undefined, or variable length sequence of parameters. A "V" notation in the length column of the tables in FIGS. 3A and 3B represents a variable length parameter with a known structure; an "N" notation in the length column represents that no parameter sequence follows the marker; a "U" notation in the length column represents that the parameter sequence is undefined; and a numeric notation in the length column represents a fixed number of parameter bytes following the marker.

For example, in FIG. 3B the restart marker Oxffd0 has no parameters; the parameters of the define restart interval marker Oxffdd are contained in the 4 bytes immediately following Oxffdd; and the start of scan marker Oxffda contains a variable-length parameter sequence.

The first parameter in any marker segment is always a two-byte code representing the length of the parameter sequence. For example, a two-byte code Ox0043 following the quantization table marker Oxffdb would represent that there are 67 parameter bytes following the marker, including the two-byte length parameter.

Markers with parameters following them are generally referred to as marker segments but the terms are used interchangeably in this application.

As discussed in detail in the Weerackody JPEG patent application, some portions of the JPEG image are more sensitive to transmission errors than others. Specifically, the markers or marker segments have been determined to be more sensitive than the entropy coded segments. The marker segments are defined as Type-I information and the entropy coded segments are defined as Type-II information.

Because the restart markers have been determined to be more sensitive than any of the other markers, the Type-I information may be further separated into Type-IA and Type-IB information. The restart markers are defined as Type-IB information and the other markers are defined as Type-IA information.

The transmission system of the Weerackody JPEG patent application takes into account the sensitivity of each of the different types of JPEG information and uses "unequal error protection" during transmission. The most powerful error protection is applied to the Type-IA information—which is the most sensitive to transmission errors. The same or a lesser level of protection is applied to the Type-IB information. Finally, the lowest level of error protection is applied to the Type-II information—the least sensitive of the three types of information.

The power of an error protection protocol is usually measured by its minimum "free distance," which is a term known to those of ordinary skill in the art. The greater the free distance of an error protection protocol the more powerful the error protection. Error protection power may also be measured by the average bit error rate (BER) for the same signal-to-noise ratio (SNR), but only if the BER is relatively constant over time. The smaller the BER of an error protection protocol the more powerful the error protection.

Applying unequal error protection serves to reduce the overhead or bandwidth (i.e., the number of redundant bits) required for error protection, and thereby increases the throughput of the transmission system and more efficiently uses the communication channel.

These advantages canbe more fully appreciated by considering the relative contributions of each type of information to the JPEG image. The most important type of information, the Type-IA information, typically takes up less than 1% of the JPEG image data stream, and the Type-IB information typically takes up only 5–10% of the JPEG image data stream. The rest of the JPEG image data stream consists of the least error sensitive Type-II information.

The Second Illustrative Embodiment

The second illustrative embodiment of the present invention combines the switched antenna diversity system of the present invention with one of the unequal error protection ARQ embodiments set forth in the Weerackody JPEG patent application.

Figure 4A:
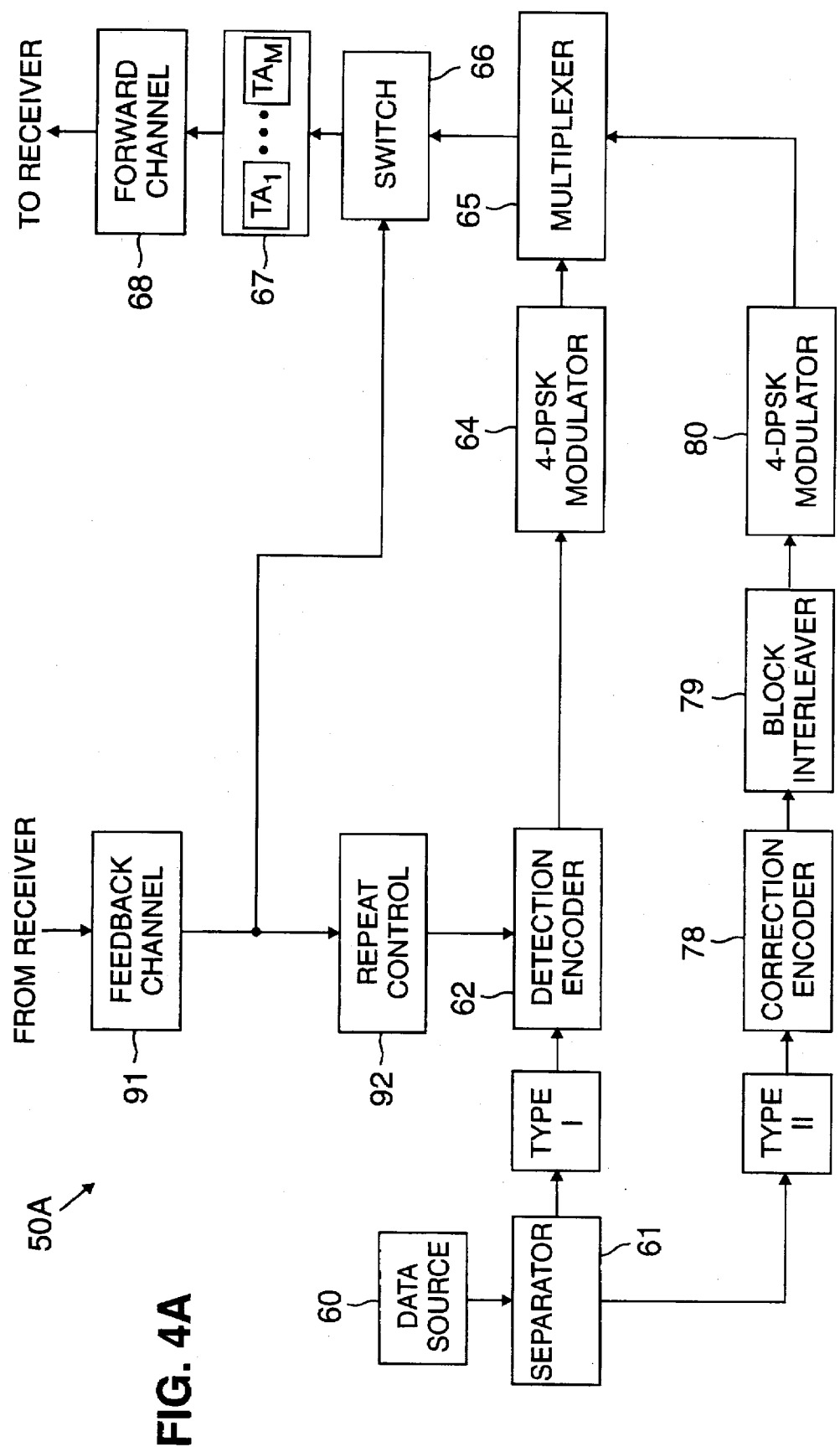
FIGS. 4A–4H show four additional illustrative embodiments of the present invention for transmitting JPEG images with unequal error protection.
Figure 4B:
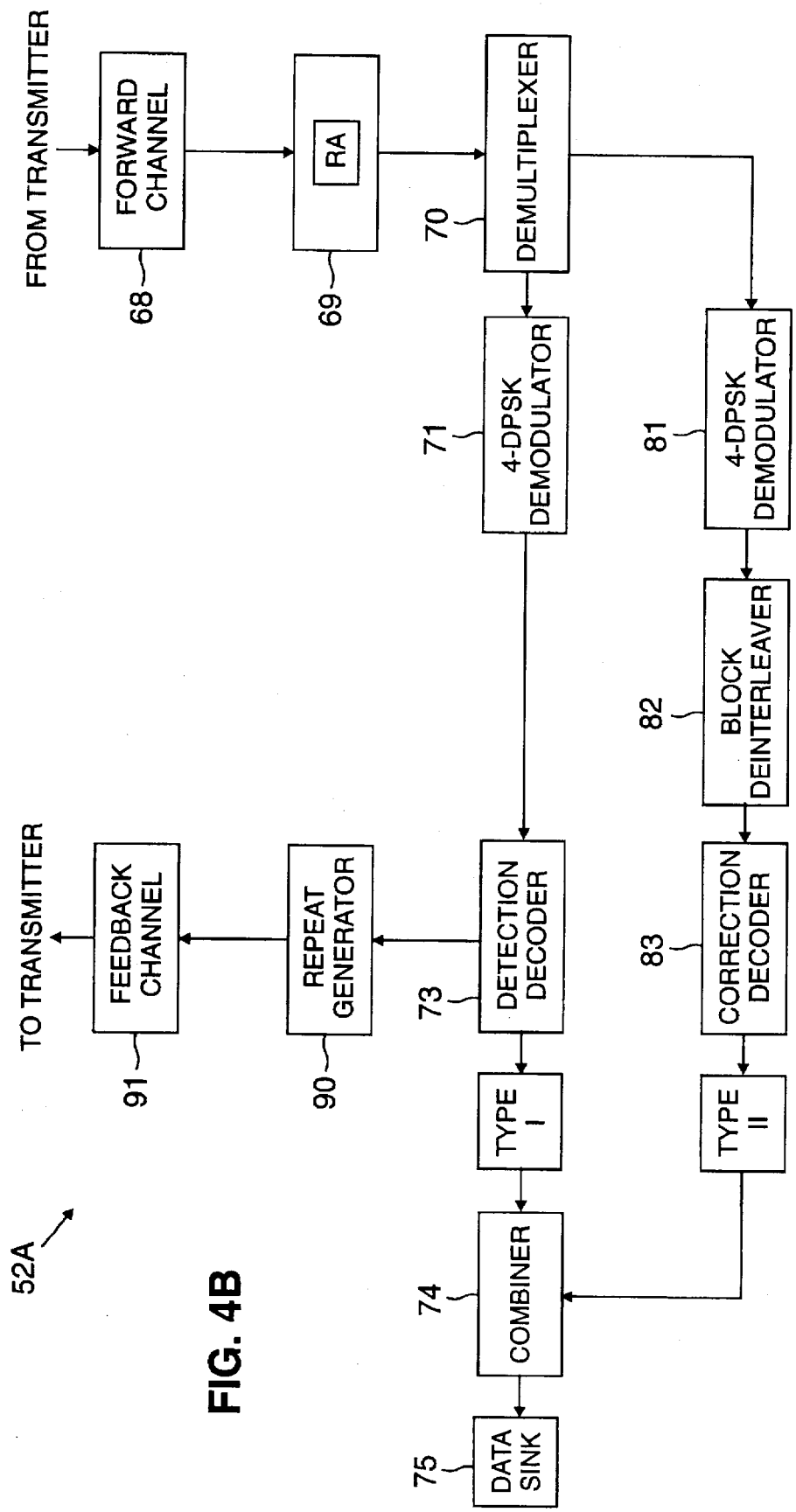

The second illustrative embodiment of the present invention is shown in FIGS. 4A and 4B. For unequal error protection, this embodiment of the present invention uses an ARQ protocol for the Type-I JPEG information and a less powerful forward error correction (FEC) code for the Type-II information.

A transmitter 50A is shown in FIG. 4A and a receiver 52A is shown in FIG. 4B. The transmitter in FIG. 4A comprises, by way of example, a separator 61, an error detection encoder 62, an error correction encoder 78, block interleaver 79, 4-DPSK modulator 80, a multiplexer 65, a switch 66, multiple antennas (TA$_1$-TA$_M$) 67 with associated transmission circuits, and a repeat controller 92.

The receiver 52A in FIG. 4B comprises, by way of example, a reception antenna (RA) 69 with associated reception circuits, a demultiplexer 70, 4-DPSK demodulators 71 and 81, block deinterleaver 82, an error detection decoder 73, an error correction decoder 83, a combiner 74, and a repeat generator 90.

In overall operation, the transmitter 50A in FIG. 4A receives a JPEG image from data source 60, for example, a JPEG encoder, separates the JPEG image into Type-I and Type-II information, and transmits the Type-I and Type-II information from one of the antennas 67 over a first forward channel 68 of a communication medium to the receiver 52A in FIG. 4B. The transmitter 50A sends the Type-I and Type-II information over the first forward channel 68 in multiplexed packets as illustrated, for example, in FIG. 5A.

At the receiver 52A in FIG. 4B, the Type-I and Type-II information packets are processed and, if no errors are detected, they are recombined by combiner 74 into a JPEG structure and transferred to the data sink 75, which may be, for example, a JPEG decoder. If errors are detected in the information packets, a retransmission request is sent by repeat generator 90 to transmitter 50A over the feedback channel 91 to retransmit the erroneous information packets from a second antenna 67 over a second forward channel 68 of the communication medium.

In more detail, the separator 61 in FIG. 4A separat the JPEG image into Type-I and Type-II information. The separator 61 may be, for example, a digital signal processor (DSP) with suitable software for separating the JPEG image into Type-I and Type-II information. As mentioned above, Type-I information is the most sensitive to transmission errors and Type-II information is the least sensitive.

The following is one example of how a DSP may be programmed to separate the Type-I information from the Type-II information for a single frame, single scan JPEG image. Other methods will be readily apparent to those of ordinary skill in the art for JPEG images having one or more frames 20 and one or more scans 23.

The DSP in this example examines the incoming bytes of the JPEG image for the hexadecimal byte ff, which denotes a marker. If an ff byte is detected, the DSP examines the next byte in the data stream, namely the marker code which describes the function of the marker. The purpose here is to determine whether the marker also includes a segment of parameters which will follow the marker in the data stream.

For example, if the next byte is hexadecimal d8, the DSP knows that the marker is a start of image marker which has no parameters, as shown in the table in FIG. 3B. In this case, the DSP separates the entire two-byte marker (ffd8) from the JPEG stream.

If, however, the next byte is hexadecimal db, the DSP knows that the marker is a define quantization table marker (ffdb) which has a variable length sequence of parameters following it in the data stream. As discussed above, markers with parameters following them are usually called marker segments.

In the case of a marker segment, the DSP examines the next two bytes in the data stream after the two-byte marker to determine the number of parameter bytes following the marker. The DSP then separates the two-byte marker and its parameter bytes from the JPEG data stream.

If a byte is not determined to be a marker or marker segment it is considered Type-II entropy coded information and sorted as such from the JPEG data stream.

In addition to separating the Type-I information from the Type-II information, the DSP also appends certain position information to the Type-I information so that the JPEG image structure can be recreated at the receiver. Various ways of doing this for one or more image frames 20, and one or more scans 23, will be readily apparent to those of ordinary skill in the art.

For example, as shown in FIG. 2, in a typical single frame, single scan JPEG image, all of the Type-I markers and marker segments occur before the Type-II entropy coded segments, with the exception of the Type-I restart markers and the end of image marker. Therefore, in a typical single frame, single scan JPEG image, only the positions of the end of image marker and restart markers need to be forwarded to the receiver.

One way the DSP can code the positions of the end of image marker and the restart markers is to keep a running count of the number of bytes in the JPEG data stream and use the byte number of the first restart marker (ffd0) as the starting position for the modulo 8 sequence of restart markers. For example, if the first restart marker (ffd0) is the 300th byte in the data stream, then its byte number is 300.

Once the byte number of the first restart marker is determined, the DSP can identify the relative byte positions of the remaining restart markers in the modulo 8 sequence (ffd1-ffd7). Specifically, the DSP may assign a byte number to each subsequent restart marker which corresponds to the number of entropy coded bytes between it and the previous restart marker.

With respect to the end of image marker, the DSP may identify its position by its byte number in the data stream. If there are 400 bytes in the JPEG image, then the position of the end of image marker will be 400.

In an alternative embodiment, the positions of the restart markers are transmitted to the receiver without the restart markers themselves. This is because the restart markers occur in a known predetermined pattern (modulo 8 sequence: 0xffd0, 0xffd1, 0xffd2, 0xffd3, 0xffd4, 0xffd5, 0xffd6, and 0xffd7) which can be generated at the receiver.

Once the JPEG image is separated by separator 61 into Type-I and Type-II information, the Type-I and Type-II information packets are, by way of example, encoded along separate Type-I and Type-II channels, as shown FIG. 4A.

Starting with the Type-I channel first, the Type-I information packets are encoded by the error detection encoder 62, which may be a CRC-16 encoder.

In this illustrative embodiment, a 4-DPSK modulator 64 modulates the encoded Type-I information packets, but any suitable modulator known to those of ordinary skill in the art may be used in its place.

Turning next to the Type-II encoding channel, the Type-II information packets are encoded by encoder 83 for error correction using an FEC code, for example, a rate ½, memory 4 convolutional code. The convolutional code provides less powerful error protection for the Type-II information than the ARQ error protection that is afforded the Type-I information.

The error correction encoded Type-II information packets are interleaved by block interleaver 83, which provides some limited time diversity. The block interleaver 83 writes the bits of each encoded Type-II packet into an m×n memory matrix in a column-wise fashion and then reads them out row-wise. The interleaver randomizes the burst errors likely to occur on slow fading channels. If a burst error of length n occurs, the interleaver functions to effectively convert the burst error into single bit errors.

In this illustrative embodiment, the modulated Type-I and Type-II information packets are multiplexed by multiplexer 65. The purpose here is to use the time slots ($t_1$ in FIG. 5A) left idle after each Type-I packet transmission when the transmitter is waiting for a positive or negative acknowledgement from the receiver.

Figure 5A:
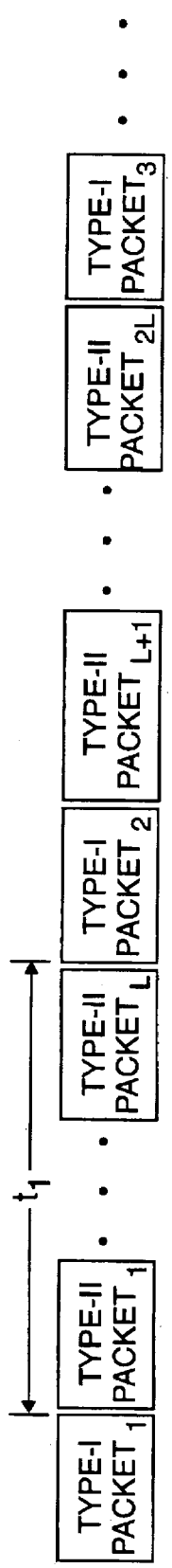
FIGS. 5A–5C illustrate multiplexed Type-I and Type-II information packets of a JPEG image transmitted using the present invention.

FIG. 5A shows one example of multiplexed Type-I and Type-II information packets. In FIG. 5A, the multiplexer multiplexes L Type-II information packets in between consecutive Type-I information packets. L can be fixed or variable. In addition, more than one Type-I information packet can be transmitted after each group of L Type-II information packets, as shown, for example, in FIG. 5C.

The multiplexed Type-I and Type-II information packets are transmitted by one of the antennas 67 (which include associated transmission circuitry) over a first forward channel 68 to receiver 52A for processing.

As shown in FIG. 4B, the multiplexed Type-I and Type-II information packets are received by the reception antenna 69 of receiver 52A, and then demultiplexed along separate decoding channels by demultiplexer 70.

Starting first with the Type-I decoding channel, the Type-I information packets are demodulated by a complementary 4-DPSK demodulator 71 and then decoded by a complementary error detection decoder 73. For example, if a CRC-16 error detection encoder is used to encode the Type-I information packets, a CRC-16 decoder is normally used to decode the Type-II packets.

As discussed above with the respect to the first illustrative embodiment, the function of the error detection decoder 73 is to re-generate the error detection code for each information packet and compare it with the error detection code that was transmitted with the Type-I information packet. If the two codes match, presumably there is no error in the transmitted packet. If the two codes do not match, there is at least one error in the transmitted packet.

Figure 5B:
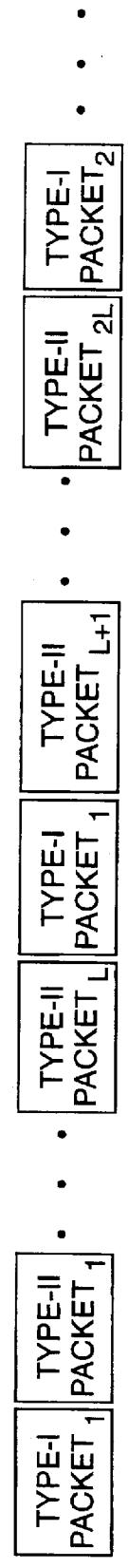
Figure 5C:

If an error is found, the erroneous Type-I information packet is discarded and a negative acknowledgement is transmitted by the repeat generator 90 over feedback channel 91. In response, the repeat controller 92 and switch 66 cause transmitter 50A to retransmit the erroneous information packet over a second forward channel. For purpose of illustration, the packet stream in FIG. 5B shows the same Type-I information packet (packet 1) being re-transmitted.

If no error is found, the Type-I information packet is forwarded to combiner 74 and a positive acknowledgement is sent by repeat generator 90 over feedback channel 91 to transmitter 50A. In response to the positive acknowledgement, repeat controller 92 causes transmitter 50A to transmit the next data packet, as illustrated in FIG. 5A.

Turning to the Type-II decoding channel, the Type-II information packets are demodulated by a complementary 4-DPSK demodulator 81, as shown in FIG. 4B.

Once demodulated, the Type-II information packets are deinterleaved by the deinterleaver 82. The de-interleaver 82 performs the inverse operation of interleaver 63. The bits of the incoming Type-I information packets are stored row-wise in an m×n memory matrix and read out column-wise.

The Type-II information packets are then passed to the error correction decoder 83. The Viterbi decoding algorithm is typically used by the error correction decoder 83 to decode a convolutional code. It will be apparent to those of ordinary skill in the art that other decoding algorithms may be used which are suitable for decoding the error correction encoded Type-II information.

The combiner 74 combines the Type-I and Type-II information packets into a structure suitable for the data sink 75, which normally will be the original JPEG structure. The combiner 69 may be a digital signal processor (DSP) which is programmed to combine the Type-I and Type-II information.

For example, the DSP may be programmed to place the first restart marker and the end of image marker at their respective byte number positions in the data stream. Each of the other restart markers is placed at a byte position relative to the preceding restart marker. As discussed above, the relative position of each restart marker was coded by separator 61 as the number of Type-II information bytes after the preceding restart marker. Finally, if only the positions of the restart markers are sent, the DSP may also be further programmed to generate the modulo 8 sequence of restart markers at the coded relative byte positions.

The Third Illustrative Embodiment

In a third illustrative embodiment of the present invention, again applied to the transmission of JPEG still images, the Type-I information is further separated into Type-IA and Type-IB information, wherein the Type-IA information is provided with more powerful error protection than the Type-IB information.

Figure 4C:
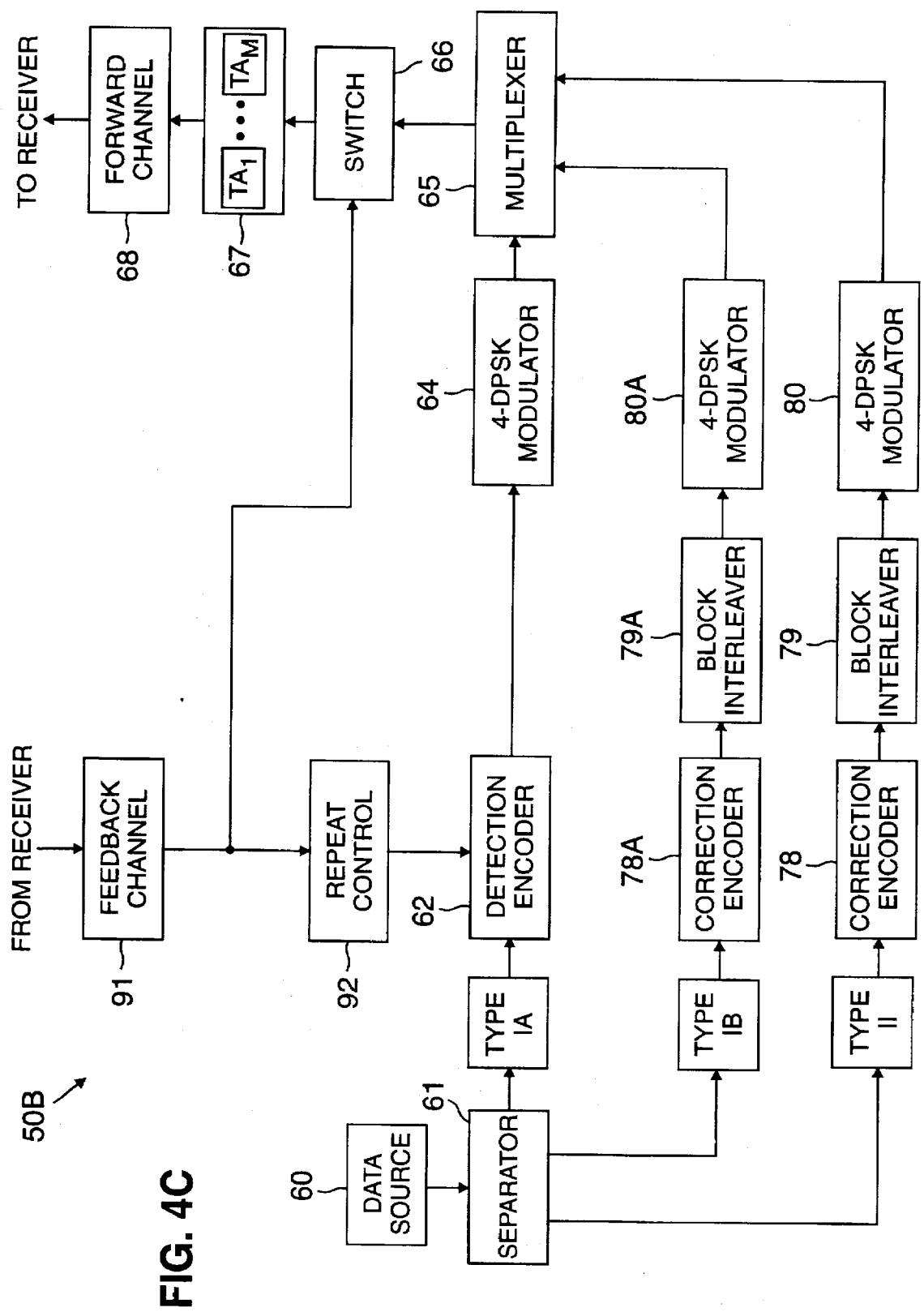
Figure 4D:
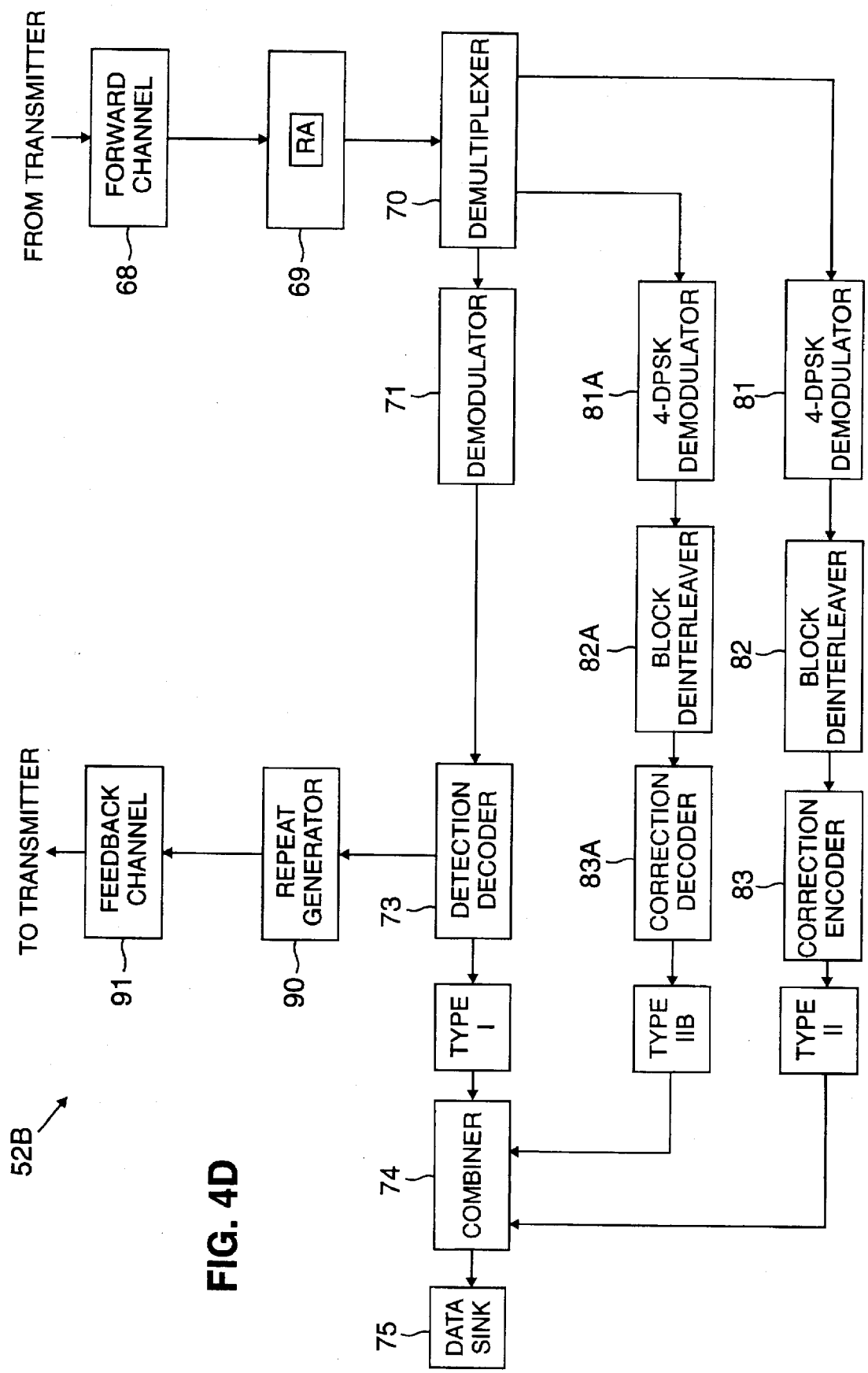

The third illustrative embodiment is shown in FIGS. 4C and 4D. A transmitter 50B is shown in FIG. 4C and a receiver 52B is shown in FIG. 4D.

In this embodiment, the separator 61 functions to separate the JPEG image into Type-IA, Type-IB, and Type-II information, and the combiner 74 functions to combine all three types of information into a JPEG structure suitable for the data sink The separator DSP of the second embodiment may be programmed to further separate the Type-I information into Type-IA and Type-IB information. For example, the DSP may separate or sort the restart markers from the other Type-I markers using the second byte of each marker which identifies its function. As shown in the table in FIG. 3B, if the byte after the ff byte is d0–d7, the marker is a restart marker and the DSP will separate it from JPEG data stream as Type-IB information. Position information may be coded by the separator as already described for the second illustrative embodiment.

The combiner DSP may also combine all three types of information in the manner described above for the second illustrative embodiment.

This third embodiment is a modification of the second embodiment shown in FIGS. 4A and 4B. As shown in FIG. 4A, the transmitter 50A (now transmitter 50B in FIG. 4C) has been modified to include an additional encoding channel for the Type-IB information. The Type-IA information is still processed along the same ARQ-based encoding channel as the Type-I information in FIG. 4A.

The Type-IB encoding channel of transmitter 50B in FIG. 4C includes an error correction encoder 78A, a block interleaver 79A, and a 4-DPSK modulator 80A. These functional blocks correspond to encoder 78, block interleaver 79, and modulator 80 described above in connection with the Type-II decoding channel of transmitter 50A in FIG. 4A. Moreover, by way of example only, the error correction encoder 78A uses the same less powerful, convolutional code as used in the error correction encoder 78 for the Type-II information, namely a rate ½, memory 4 convolutional code.

By comparison of FIGS. 4B and 4D, one can see that the receiver 52A of FIG. 4B (now receiver 52B of FIG. 4D) has also been modified to include a separate decoding channel for the Type-IB information. The Type-IA information is decoded on the same Type-I ARQ-based encoding channel shown in FIG. 4B.

Specifically, the Type-IB decoding channel of receiver 52B in FIG. 4D includes a demodulator 81A, a block interleaver 82A, and an error correction decoder 83A. The decoding process for the Type-IB information is the same as the decoding process used for the Type-II information because the same convolutional code was used for both the Type-IB and Type-II information in this illustrative embodiment. As mentioned above, the Viterbi algorithm is typically used to decode the convolutional code used with the Type-IB information.

The Fourth Illustrative Embodiment

Figure 4E:
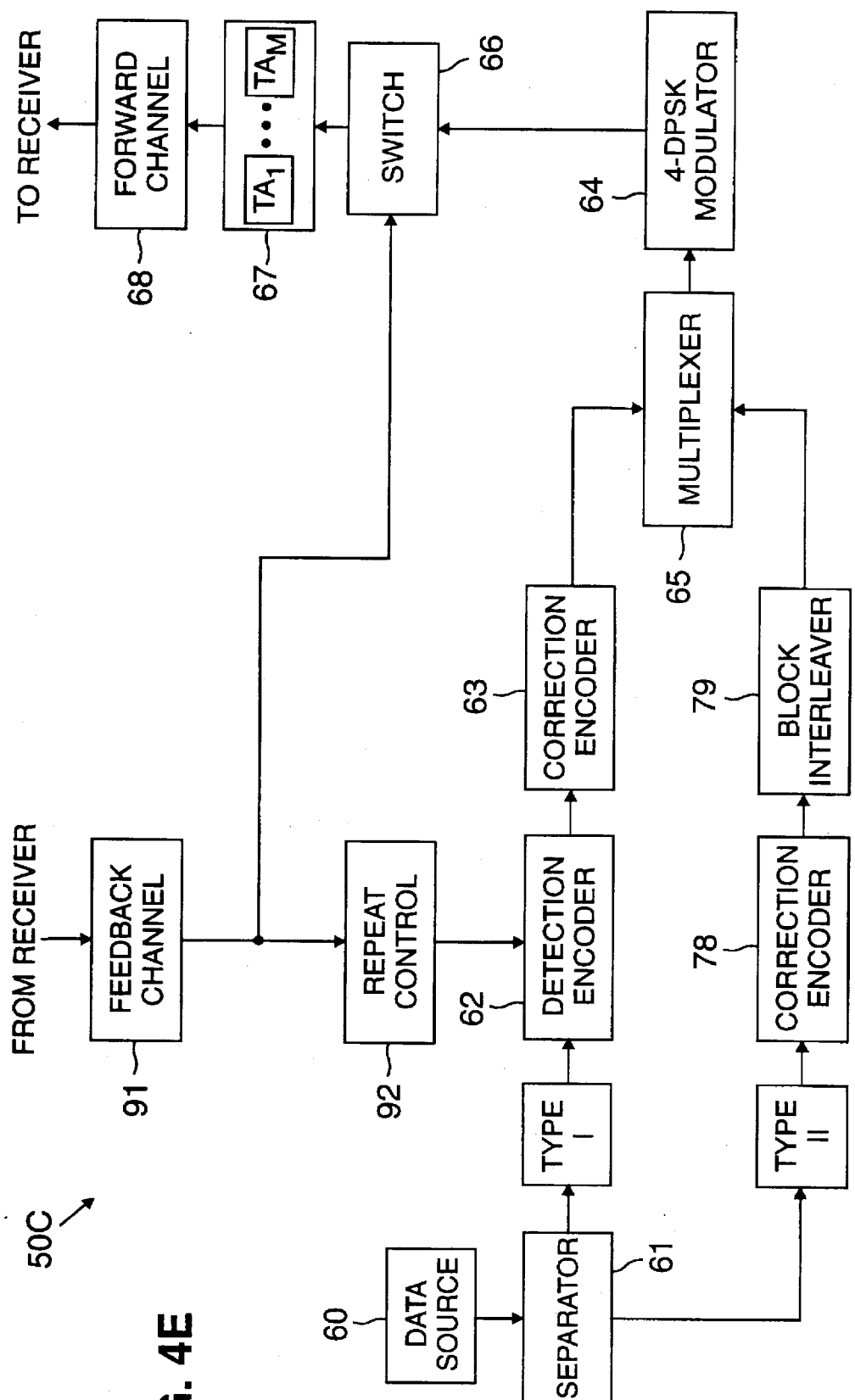
Figure 4F:
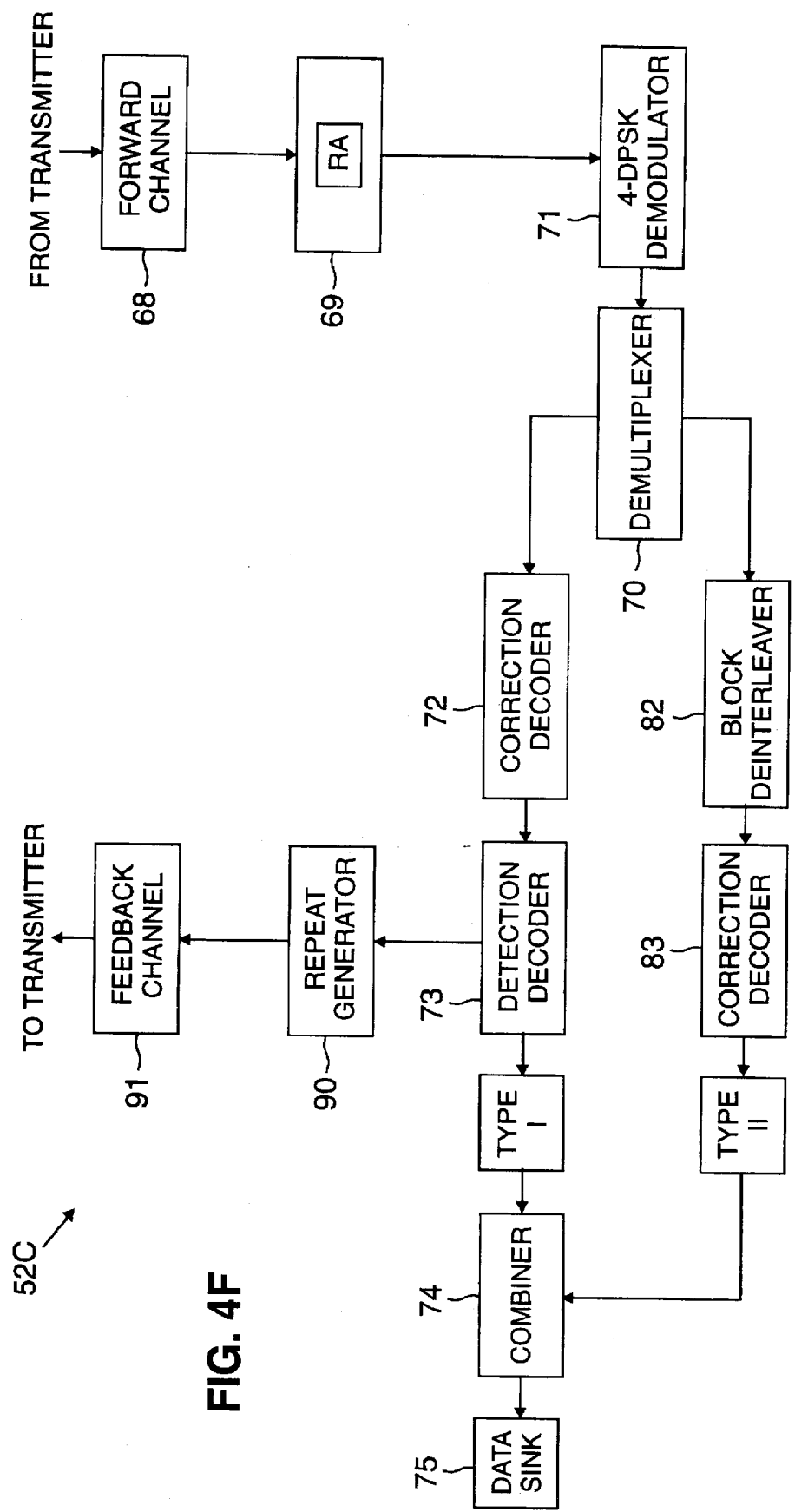

A fourth illustrative embodiment of the present is shown in FIGS. 4E and 4F. FIG. 4E shows a transmitter 50C and FIG. 4F shows are receiver 52C. They are modifications of the transmitter 50B and receiver 52B of FIGS. 4C and 4D, respectively.

This embodiment uses a hybrid ARQ protocol. As shown in FIGS. 4E and 4F, the hybrid protocol is implemented by the inclusion of an error correction encoder 63 in transmitter 50B of FIG. 4C and by the inclusion of a complementary error correction decoder 72 in receiver 52B of FIG. 4D. The purpose is to correct the errors in an erroneous packet before requesting retransmission of the erroneous packet. In this regard, any suitable error correction code to known to those of ordinary skill in the art may be used.

The Fifth Illustrated Embodiment

For purpose of illustration, in a fourth illustrative embodiment, the present invention multiplexes the Type-I and Type-II information packets in advance of modulation. And on the receiving end, the Type-I and Type-II information packets are demodulated before being demultiplexed.

Figure 4G:
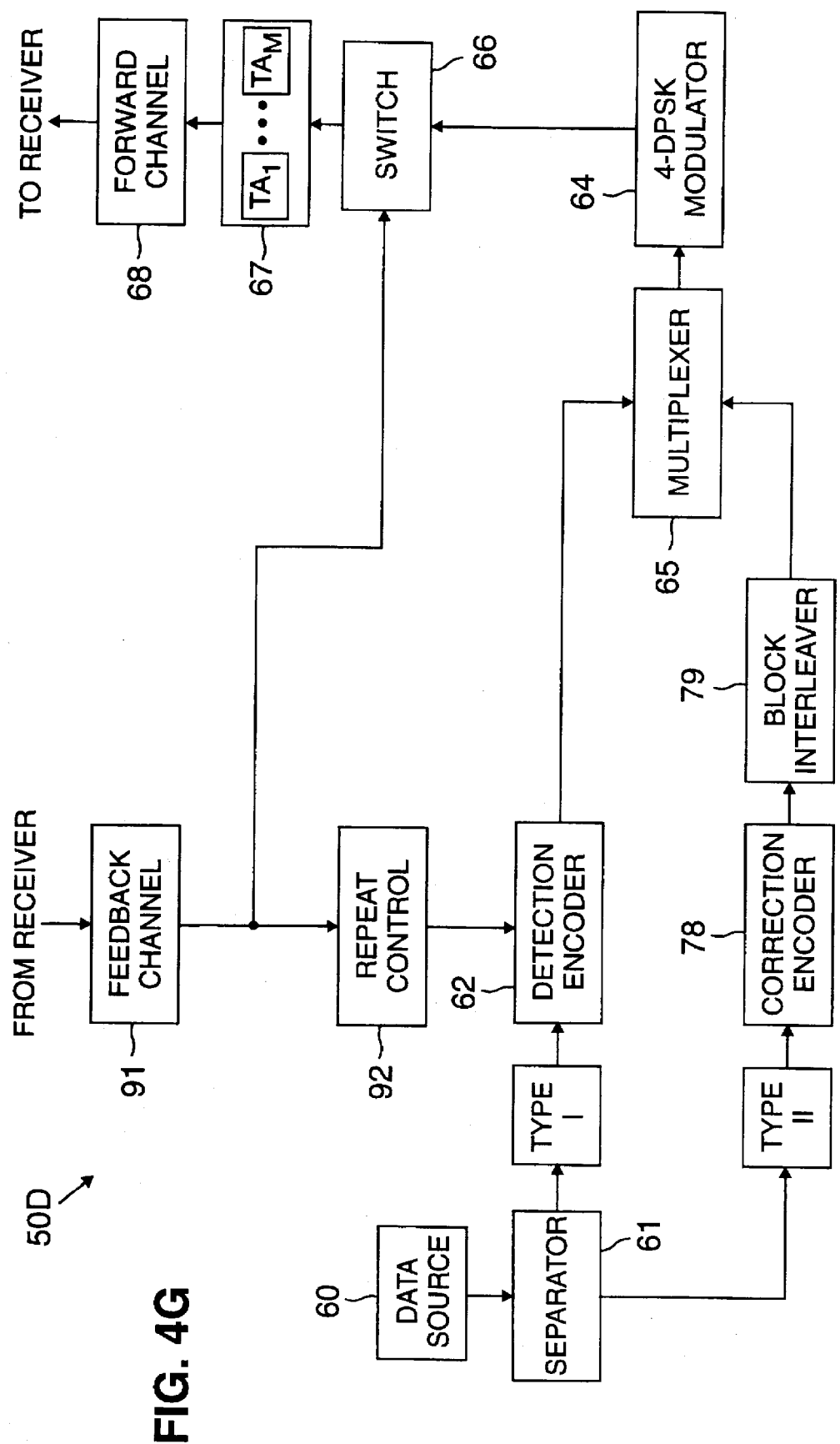

This illustrative embodiment is shown in FIGS. 4E and 4F. A transmitter 50D is shown in FIG. 4G and a receiver 52D is shown in FIG. 4H.

The transmitter 50D is a modification of the transmitter 50A shown in FIG. 4A. As shown in FIG. 4G, the multiplexer 65 of FIG. 4A has been placed in advance of any modulation, and only modulator 64 is used to modulate the multiplexed Type-I and Type-II information packets.

Figure 4H:
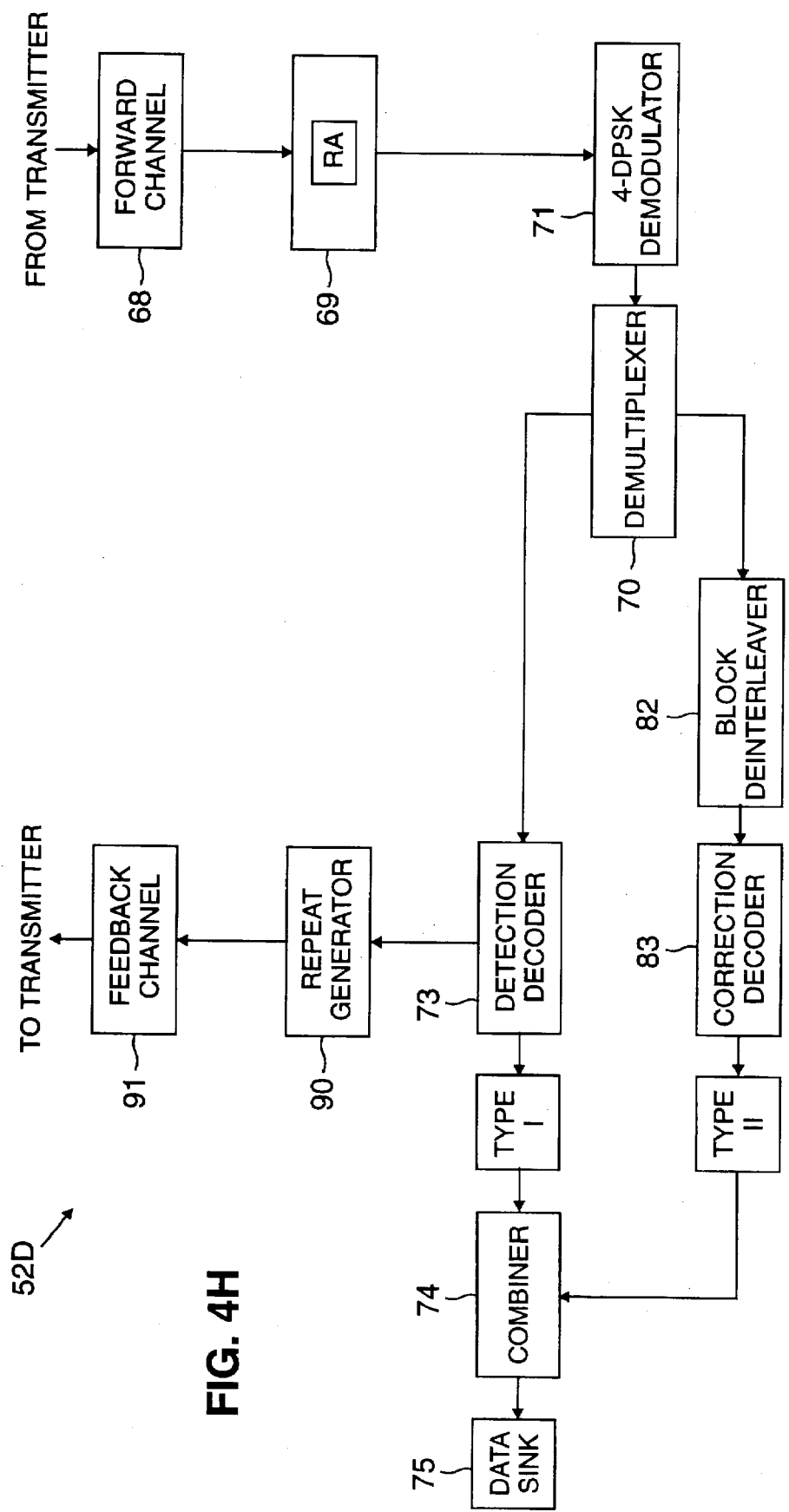

A complementary receiver 52D is shown in FIG. 4H. Receiver 52D is a modification of the receiver 52A in FIG. 4B. As shown in FIG. 4H, the receiver 52A of FIG. 4B has been modified to place the demultiplexer 70 after the demodulation of the Type-I and Type-II information packets. Moreover, only demodulator 71 remains for demodulating the interleaved Type-I and Type-II information packets.

The advantages of the present invention are best achieved on slow fading channels with relatively small packet sizes and multiplex ratios. In addition, significant performance gains can be achieved on slow fading channels with a large number of transmit antennas.

Various changes and modifications of the present invention will be readily apparent to those of ordinary skill in the art, and all such changes and modifications are considered to fall within the scope of the invention as defined by the appended claims. In particular, the present invention may also be used with fast-fading channels.

We claim:

1. A transmitter for transmitting information packets over a wireless communication medium to a receiver, comprising:

an error detection encoder for encoding the information packets with an error detection code;

a modulator for modulating the error detection encoded information packets;

a first antenna for transmitting the modulated information packets over a first forward channel of the communication medium to the receiver;

a second antenna for transmitting the modulated information packets over a second forward channel of the communication medium to the receiver in place of the first antenna; and a switch for switching from the first antenna to the second antenna in response to a negative acknowledgement from the receiver transmitted over a feedback channel of the communication medium.

2. The transmitter of claim 1, wherein the first forward channel is a slow fading channel.

3. The transmitter of claim 1, wherein the second forward channel is a slow fading channel.

4. The transmitter of claim 1, wherein the error detection encoder is a CRC-16 encoder.

5. The transmitter of claim 1, wherein the modulator is a 4-DPSK modulator.

6. The transmitter of claim 1, wherein the switch is a hardware switch.

7. The transmitter of claim 1, wherein the switch is a programmable switch.

8. The transmitter of claim 1, wherein the switch is an electronic switch.

9. The transmitter of claim 1, wherein the switch is a magnetic switch.

10. A method of transmitting information packets over a wireless communication medium to a receiver, comprising:

encoding the information packets with an error detection code;

modulating the error detection encoded information packets;

transmitting the modulated information packets from a first antenna over a first forward channel of the communication medium to the receiver; and switching from the first antenna to a second antenna for transmitting the modulated packets over a second forward channel of the communication medium in response to a negative acknowledgement from the receiver transmitted over a feedback channel of the communication medium.

11. A transmitter for transmitting a JPEG image over a wireless communication medium to a receiver with unequal error protection, comprising:

a separator for separating the JPEG image into Type-I and Type-II information;

an error detection encoder for encoding the Type-I information with an error detection code;

an error correction encoder for encoding the Type-II information with an error correction code;

a modulator for modulating the encoded Type-I and Type-II information;

a first antenna for transmitting the modulated Type-I and Type-II information over a first forward channel of the communication medium to the receiver;

a second antenna for transmitting the modulated Type-I and Type-II information over a second forward channel of the communication medium to the receiver in place of the first antenna; and a switch for switching from the first antenna to the second antenna in response to a negative acknowledgment from the receiver transmitted over a feedback channel of the communication medium.

12. The transmitter of claim 11, wherein the first forward channel is a slow fading channel.

13. The transmitter of claim 11, wherein the second forward channel is a slow fading channel.

14. The transmitter of claim 11, wherein the separator is a digital signal processor.

15. The transmitter of claim 14, wherein the digital signal processor is an AT&T DSP32C.

16. The transmitter of claim 11, wherein the error correction encoder encodes the Type-II information with a rate ½, memory 4 convolutional code.

17. A transmitter for transmitting a JPEG image over a wireless communication medium to a receiver with unequal error protection, comprising:

a separator for separating the JPEG image into Type-IA and Type-IB information;

an error detection encoder for encoding the Type-IA information with an error detection code;

an error correction encoder for encoding the Type-IB information with an error correction code;

a modulator for modulating the encoded Type-IA and Type-IB information;

a first antenna for transmitting the modulated Type-IA and Type-IB information over a first forward channel of the communication medium to the receiver;

a second antenna for transmitting the modulated Type-IA and Type-IB information over a second forward channel of the communication medium to the receiver in place of the first antenna; and a switch for switching from the first antenna to the second antenna in response to a negative acknowledgment from the receiver transmitted over a feedback channel of the communication medium.

18. A transmitter for transmitting a JPEG image over a wireless communication medium to a receiver with unequal error protection, comprising:

a separator for separating the JPEG image into Type-I and Type-II information;

an error detection encoder for encoding the Type-I information with an error detection code;

a modulator for modulating the encoded Type-I information and the Type-II information;

a first antenna for transmitting the modulated Type-I and Type-II information over a first forward channel of the communication medium to the receiver;

a second antenna for transmitting the modulated Type-I and Type-II information over a second forward channel of the communication medium to the receiver in place of the first antenna; and a switch for switching from the first antenna to the second antenna in response to a negative acknowledgment from the receiver transmitted over a feedback channel of the communication medium.

19. A transmitter for transmitting a JPEG image over a wireless communication medium to a receiver with unequal error protection, comprising:

a separator for separating the JPEG image into Type-IA and Type-IB information;

an error detection encoder for encoding the Type-IA information with an error detection code;

a modulator for modulating the encoded Type-IA information and the Type-IB information;

a first antenna for transmitting the modulated Type-IA and Type-IB information over a first forward channel of the communication medium to the receiver;

a second antenna for transmitting the modulated Type-IA and Type-IB information over a second forward channel of the communication medium to the receiver in place of the first antenna; and a switch for switching from the first antenna to the second antenna in response to a negative acknowledgment from the receiver transmitted over a feedback channel of the communication medium.

20. A method for transmitting a JPEG image over a wireless communication medium to a receiver with unequal error protection, comprising:

separating the JPEG image into Type-I and Type-II information;

encoding the Type-I information with an error detection code;

encoding the Type-II information with an error correction code;

modulating the encoded Type-I and Type-II information;

transmitting the modulated Type-I and Type-II information from a first antenna over a first forward channel of the communication medium to the receiver; and switching from the first antenna to a second antenna for transmitting the modulated Type-I and Type-II information over a second forward channel of the communication medium in response to a negative acknowledgment from the receiver transmitted over a feedback channel of the communication medium.

21. A method for transmitting a JPEG image over a wireless communication medium to a receiver with unequal error protection, comprising:

separating the JPEG image into Type-IA and Type-IB information;

encoding the Type-IA information with an error detection code;

encoding the Type-IA information with an error correction code;

modulating the encoded Type-IA and Type-IB information;

transmitting the modulated Type-IA and Type-IB information from a first antenna over a first forward channel of the communication medium to the receiver; and switching from the first antenna to a second antenna for transmitting the modulated Type-I and Type-II information over a second forward channel of the communication medium in response to a negative acknowledgment from the receiver transmitted over a feedback channel of the communication medium.

22. A method of transmitting a JPEG image over a wireless communication medium to a receiver with unequal error protection, comprising:

separating the JPEG image into Type-I and Type-II information;

encoding the Type-I information with an error detection code;

modulating the encoded Type-I information and the Type-II information;

transmitting the modulated Type-I and Type-II information from a first antenna over a first forward channel of the communication medium to the receiver; and switching from the first antenna to a second antenna for transmitting the modulated Type-I and Type-II information over a second forward channel of the communication medium in response to a negative acknowledgment from the receiver transmitted over a feedback channel of the communication medium.

23. A method of transmitting a JPEG image over a wireless communication medium to a receiver with unequal error protection, comprising:

separating the JPEG image into Type-IA and Type-IB information;

encoding the Type-IA information with an error detection code;

modulating the encoded Type-IA information and the Type-IB information;

transmitting the modulated Type-IA and Type-IB information from a first antenna over a first forward channel of the communication medium to the receiver; and switching from the first antenna to a second antenna for transmitting the modulated Type-IA and Type-IB information over a second forward channel of the communication medium in response to a negative acknowledgment from the receiver transmitted over a feedback channel of the communication medium.

* * * * *